United States Patent
Flanagan et al.

(10) Patent No.: US 6,378,087 B1
(45) Date of Patent: Apr. 23, 2002

(54) SYSTEM AND METHOD FOR DYNAMICALLY DETECTING UNCHECKED ERROR CONDITION VALUES IN COMPUTER PROGRAMS

(75) Inventors: Cormac A. Flanagan, Sunnyvale; Michael Burrows, Palo Alto, both of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/327,999

(22) Filed: Jun. 8, 1999

(51) Int. Cl.[7] .............................. G06F 9/455; G06F 9/54
(52) U.S. Cl. ............................................ 714/38; 714/4
(58) Field of Search ........................ 714/25, 38; 717/4, 717/5; 703/22; 711/100; 712/233, 244; 709/300

(56) References Cited

U.S. PATENT DOCUMENTS

| | | | | |
|---|---|---|---|---|
| 5,274,817 A | * | 12/1993 | Stahl | |
| 5,745,879 A | * | 4/1998 | Wyman | |
| 6,247,171 B1 | * | 6/2001 | Yellin et al. | |
| 6,249,882 B1 | * | 6/2001 | Testardi | |

* cited by examiner

Primary Examiner—Gopal C. Ray
(74) Attorney, Agent, or Firm—Pennie & Edmonds LLP

(57) ABSTRACT

The disclosed program checker checks whether a program internally tests for error codes that may be returned by procedures used by the program. The program being tested is executed. Each time that a subroutine in the program is about to perform a subroutine or procedure return operation, a program interpreter is invoked. The program interpreter simulates continued execution of the program once for a good return value and once for each error condition return value that is listed in an error condition table entry for the subroutine in which the return operation is being performed. For each simulation of the program, the program interpreter determines the execution path of the program and then compares the execution path for each error condition return value with the execution path for the good return value. If the execution path for any error condition return value is the same as the execution path for a good return value, an error report is generated to indicate that the corresponding error condition return value is not checked by the program.

22 Claims, 4 Drawing Sheets

Error Condition Table
120
| ID: proc A | Error Condition List for procedure A | 150-1 |
| ID: proc B | Error Condition List for procedure B | 150-2 |
| ... | | |
| | | |
FIG. 2A
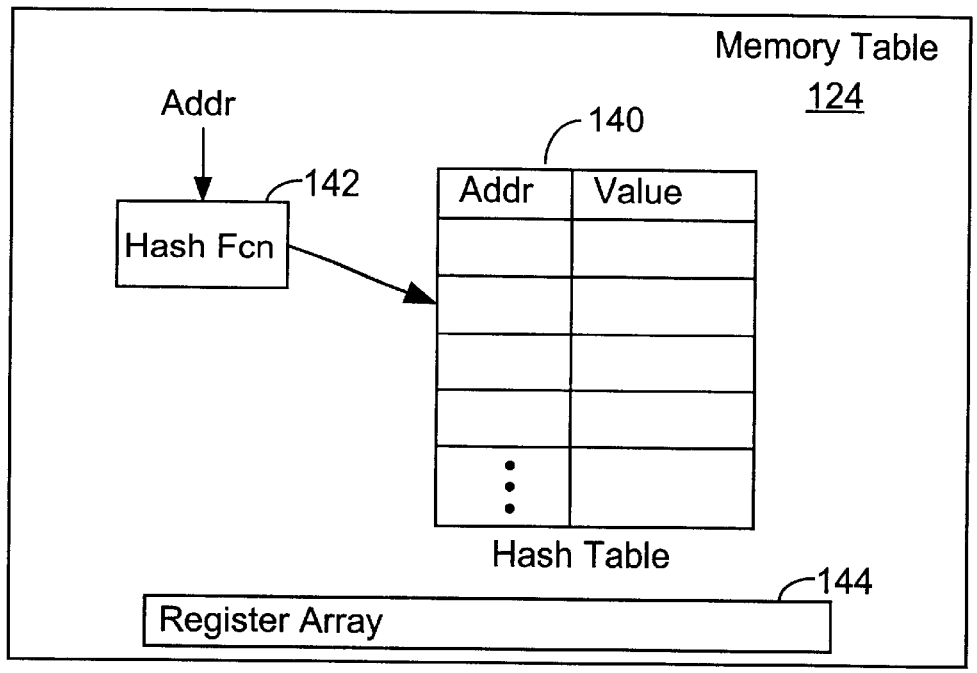
FIG. 2B
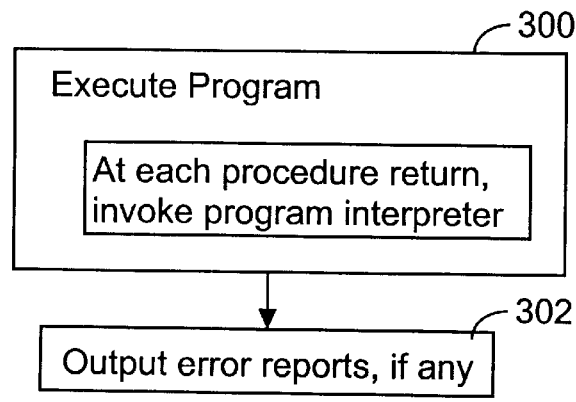
FIG. 3A SYSTEM AND METHOD FOR
DYNAMICALLY DETECTING UNCHECKED
ERROR CONDITION VALUES IN
COMPUTER PROGRAMS The present invention relates generally to a tool for verifying the operability of a computer program in the presence of error conditions, and particularly to a system and method for dynamically detecting whether the program explicitly handles a set of defined error conditions.

BACKGROUND OF THE INVENTION

Computer programs make subroutine calls that perform operations that may fail. Failures may occur because a resource has been over-committed, or because the system is in an unexpected state that is inconsistent with the operation requested. For programs written in some computer languages, failures are turned into "exceptions" that divert the flow of control in the program to an alternative path which reacts to the failure.

However, many computer languages do not provide such exception handling features. For example, C programs do not use exceptions. When using such computer languages, it is the responsibility of the programmer to write procedures so that they return distinguished values, sometimes called error condition values or error return codes, that indicate error conditions. Furthermore, when writing procedures that call a procedure that can return one or more error codes, the programmer is responsible for testing for these error codes explicitly in the calling procedures. If the programmer fails to code the calling procedure so as to detect every possible error condition value that may be returned by each called procedure, an unexpected error may go undetected and lead to the program "crashing," or corruption of data, or other outcomes less desirable than the program simply stopping.

The task of checking for all possible errors indicated by called procedures is not difficult, but it is tedious, and often neglected. This leads to software that is unreliable, and subject to "mysterious" and difficult to reproduce failures or errors.

It would be desirable to have a tool that identified all error codes that can be returned by a set of called procedures, but which have not been tested for in a calling procedure. One solution is to force each error to occur, and then observe the results. Error codes are artificially introduced. For example, one might rewrite a routine to fail at random intervals. However, there are several drawbacks to this solution. First, since a very large number of errors are possible, it can be a daunting task to test each possible error case. Second, each introduced error code may cause the program to crash, thus requiring a restart after every test.

Even when a program is written in a language that provides an exception handling mechanism, it is often possible for the programmer to fail to specify the exception handling procedures for some of the possible exceptions, leading to crashes rather than more appropriate handling.

One type of program checker, sometimes called "lint" or a "lint checker" determines when a value returned by a called procedure is ignored or discarded by the calling procedure and generates a corresponding warning message. However, lint checkers do not distinguish between a normal return value and an error return value. Therefore lint checkers will not produce a warning when a program uses the value returned by a called procedure, but fails to check whether the returned value indicates an error condition.

In another approach, one can log procedure calls as they are executed. This allows unexpected errors to be detected outside the program. Parasoft's Insure++ checking tool is an example of a tool designed explicitly for the purpose of detecting unexpected error returns from system calls. However, such checking helps only to discover an error that has occurred and not properly handled by a program, rather than helping to detect whether the program is ready to handle unexpected errors that might one day occur.

SUMMARY OF THE INVENTION

In summary, the present invention relates to a tool for detecting unchecked error codes in computer programs. This invention provides a tool that permits a programmer to check whether he has tested for error codes within a program while running the program once or a small number of times. It eases the burden on the programmer by automating much of the checking, and requiring the program to run only as many times as is necessary to cover all the non-error code paths, rather than once per error checked.

The user identifies a number of procedures that can return an error status value, and how the procedures indicate various errors, for example by pushing onto the program stack a return code having a particular value. This information is given to the tool, which instruments the procedures in the program to be tested. When the program being tested is executed, each time that a procedure that could return an error code is called, execution of the program using both a good return value and one or more error return values is simulated.

In one simulation, a non-error value is returned, and the execution path of the program is observed. In each other simulation, a corresponding error code is returned, and the execution path of the program is observed. The execution path of the program for each distinct error code return value of the called procedure is compared with the execution path of the program when the non-error value is returned by the called procedure. If the two paths differ, the program is assumed to handle the corresponding error code. If the two paths do not differ, a report is generated indicating that the program does not appear to properly handle the error condition corresponding to the error code return value.

The simulation process is preferably accomplished by using an interpreter to execute instructions of the program, without affecting the state of the program's actual address space. This allows the behavior of the program to be examined for each possible error condition, without having to restart the program test for proper handling of each such error condition.

The programmer, or program tester, provides a specification of error code return values for each of a set of procedures that are called by the program to be tested. Whenever a procedure whose error return values have been specified is executed, the tool of the present invention starts interpreting instructions just following the return from the procedure. The interpreter uses a table to store values written to memory by interpreted instructions. Further, whenever an interpreted instruction reads a value from memory or a register, the table is checked to see if it holds the memory location being read. If found in the table, the value stored in the table is used, and otherwise the memory location in the program's regular address space is read.

During interpretation of the program, system calls that affect state outside the address space are ignored. System calls that modify the address space in unpredictable ways or destroys the address space cause interpretation to terminate. Invalid memory accesses also cause interpretation to terminate.

BRIEF DESCRIPTION OF THE DRAWINGS

Additional objects and features of the invention will be more readily apparent from the following detailed description and appended claims when taken in conjunction with the drawings, in which:

FIG. 2A depicts an error condition table.

FIG. 2B depicts a memory table.

FIG. 3A is a flow chart of an embodiment of the present invention.

DESCRIPTION OF THE PREFERRED EMBODIMENTS

Figure 1:
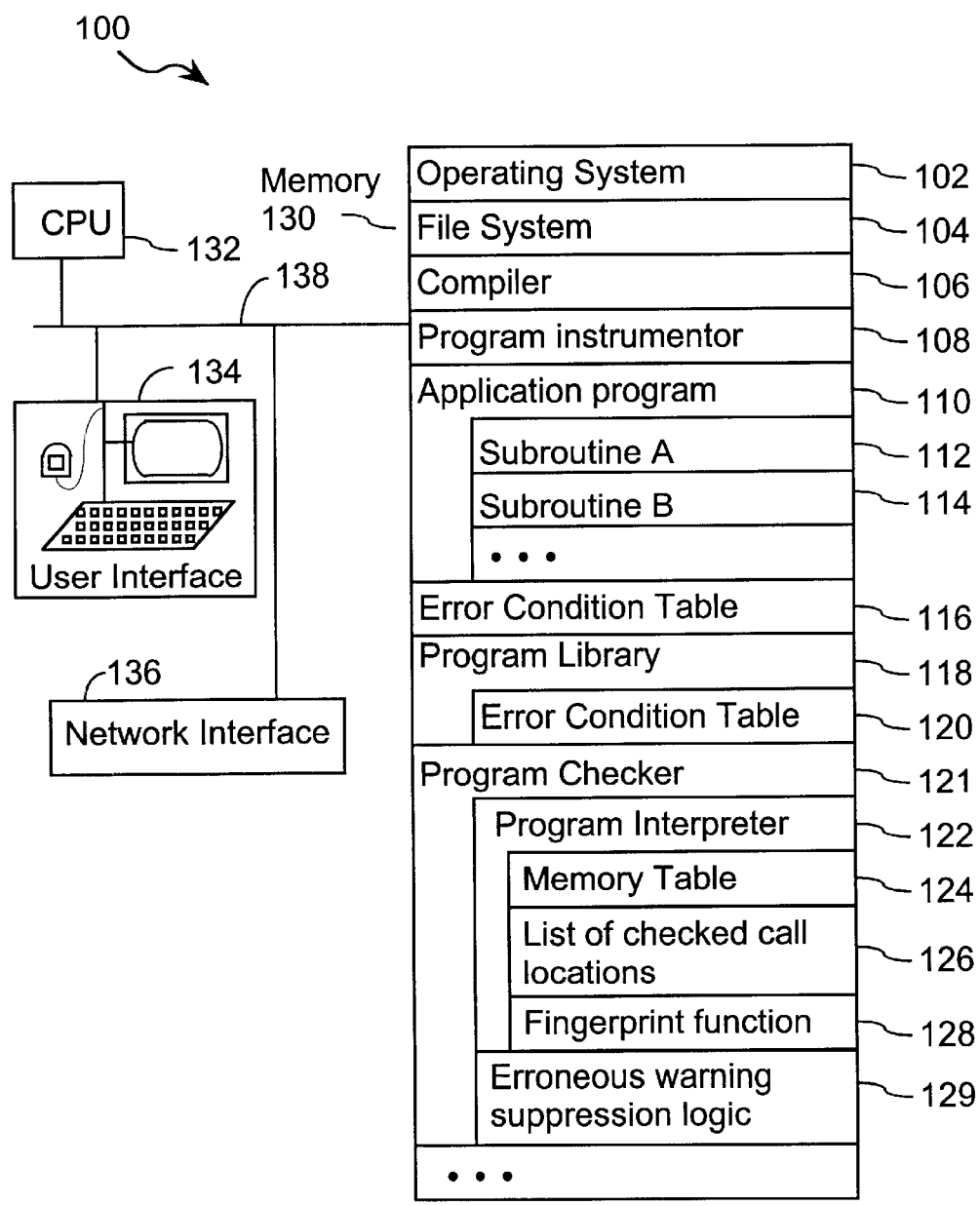
FIG. 1 is a block diagram of a computer system in which an embodiment of the present invention is implemented.

In FIG. 1, the computer system 100 includes one or more data processors (CPU's) 132, a user interface 134, network interface 136 and memory 130, interconnected by one or more system busses 138. The memory 130 preferably includes both high speed random access memory and non-volatile storage such as disk storage. The memory 130 may store an operating system 102 for performing basic system services, a file system 104, a compiler 106 for compiling application programs, a program instrumentor 108, an application program 110, an error condition table 116, a program library 118 and a program checker 121. As will be discussed in more detail below, the program instrumentor 108 is used for instrumenting application programs to perform automatic error checking tasks.

The application program 110 includes subroutines, designated here as subroutine A 112, subroutine B 114, etc. The program library 118 preferably includes an error condition table 120, the purpose of which will be explained below. The program checker 121 preferably includes a program interpreter 122 that, in turn, includes a memory table 124, a list of checked call locations 126 and a fingerprint function 128. The program checker 121 may also include logic 129 for suppressing the generation of erroneous warning messages. In some embodiments the warning suppression logic 129 is incorporated in the program interpreter 122.

FIG. 2A shows an Error Condition Table 120. Error Condition Table 120 preferably contains a list of error conditions for each subroutine A 150-1, B 150-2 of the program to be tested. For each user provided procedure, the list of error conditions is provided by the user, while for established libraries of subroutines (procedures) the list of error conditions for each subroutine is preferably provided by the library vendor.

More specifically, the list of error conditions for a subroutine specifies return code values, or other return values that indicate respective error return conditions. For purposes of the present invention, the exact nature of the error return conditions is not important, only the return indicia that should be checked by a calling procedure to detect the error return conditions are relevant.

FIG. 2B shows a preferred implementation of the memory table 124 used during simulation of the program being tested. More specifically, part of the test procedure includes simulating operation of various parts of the program, but without modifying the content of the program's address space. During such simulations of the test procedure, all changes to the contents of the CPU registers used by the program are stored in a register array 144, and all changes to memory locations used by the program are stored in a hash table 140 instead in their normal register or memory locations. Because registers are used so frequently, at the start of each simulation the CPU registers are copied into the register array 144, which is then used for all subsequent register read and write operations. Hash function 142 is used to map the address to which data is being written, or read, into a hash table location. In addition, whenever the simulated program reads a memory location, the simulator checks the memory table 124 to see if the content of that memory location is stored in the hash table 140 before attempting to read the value stored in the address space in which the program is being executed.

In alternate embodiments, other types of tables (other than a hash table) could be used to store memory values updated by the program simulation.

FIG. 3A is a simplified flow chart of a preferred embodiment of the present invention. The program being tested is executed at step 300. Each time that a subroutine that may return an error code is about to perform a subroutine return operation, the program interpreter is invoked. The program interpreter simulates continued execution of the program once for a good return value and once for each error condition return value that is listed in the error condition table entry (if any) for the subroutine that the return operation is being performed. For each simulation of the program, the program interpreter determines the execution path of the program and then compares the execution path for each error condition return value with the execution path for the good return value. In a preferred embodiment, if the execution path for any error condition return value is the same as the execution path for a good return value, an error report is generated at step 302.

Figure 3B:
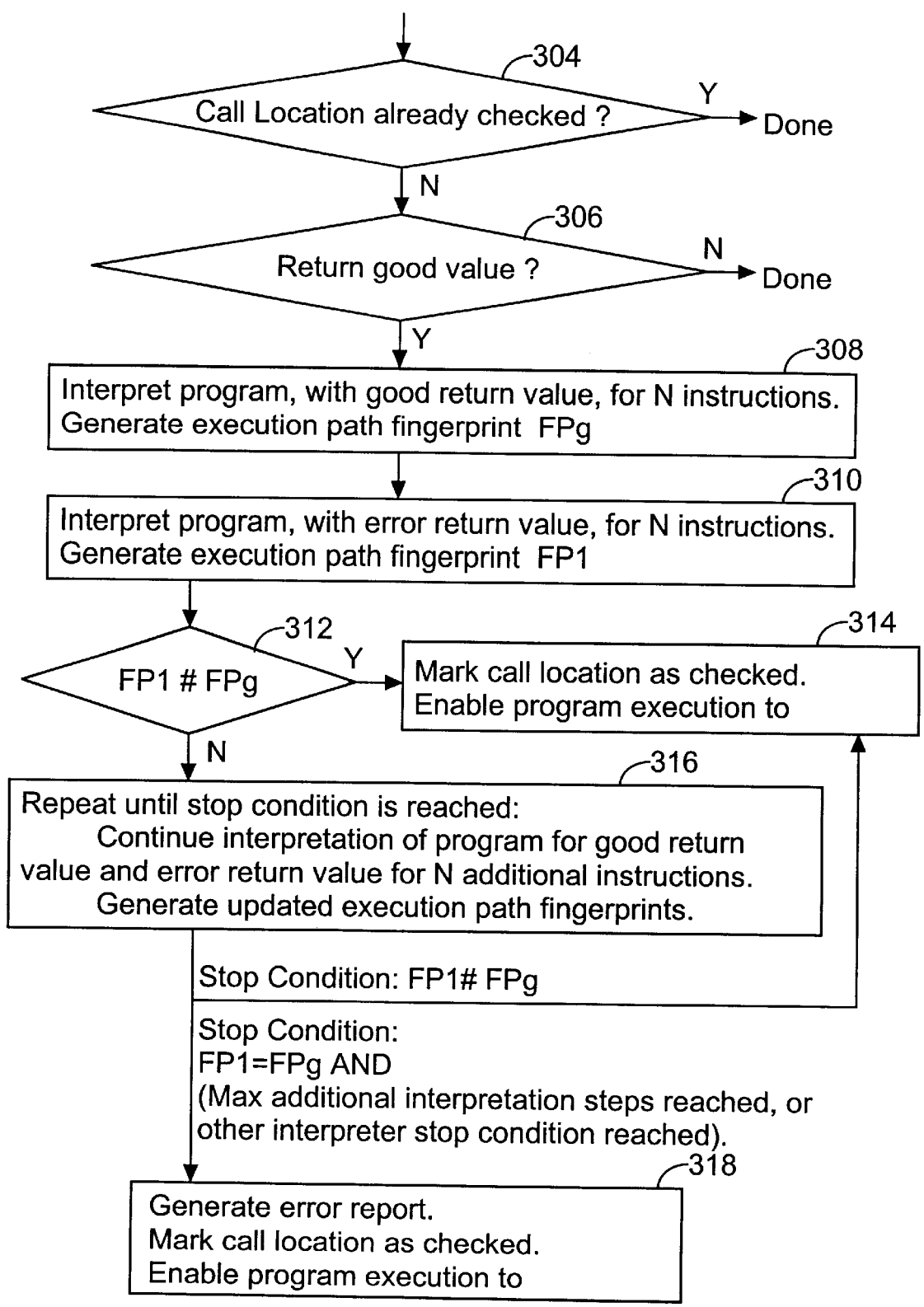
FIG. 3B is a flow chart of an embodiment of the present invention.

FIG. 3B is a more detailed flow chart of an embodiment of the present invention. For ease of explanation, it is assumed that each procedure listed in the error condition table has only a single specified error condition. Testing for error checking when procedures have more than one error condition is explained later, with respect to FIG. 3C.

Prior to execution of the program to be checked, the compiled program is "instrumented" to insert a procedure call to the program checker of the present invention immediately before each "return" instruction in each procedure listed in the error condition table. Thus, immediately before each such procedure returns control to a calling procedure, the program checker is called. In a preferred embodiment, the instrumentation of the program to be checked is accomplished using a binary rewriting tool such as Compaq Computer Corporation's ATOM™ program.

The flow chart in FIG. 3B shows the execution of the program checker (sometimes herein called the program interpreter) whenever it is called by the instrumented program. First, the program checker determines if the calling location to which returning procedure is about to return control has already been checked for proper error condition handling of this specific invocation of the returning procedure (304). If so, the program checker exits and returns control to the calling program. Thus, each call location, for calling a procedure listed in the error condition table, is tested only once. If the call location has not already been tested, the program checker continues at step 306.

If the returning procedure is returning an error condition value, the program checker exits and returns control to the calling program (306-N). The reason for this is that the program checker cannot predict what a good (non-error) return value would be, and returning a randomly selected "legal" value might cause the program under test to crash. For instance, if a memory allocation procedure returns an error value, there is no way for the checker program to generate a truly "good" return value since the called procedure did not allocate a block of memory.

If the returning procedure is returning a good, non-error return value (306-Y), the program checker continues at step 308. At step 308 the program checker interprets execution of the program under test, as described above, without modifying the address space of the program under test. The simulated execution is preferably performed for a predetermined number of instructions, herein designated as "N," such as thirty-two, sixty-four or perhaps a hundred or so instructions.

The program checker also simulates execution of the program, in yet another address space copy, using one of the error return values listed in the error condition table, for the same number of instructions, N (310). For both simulations of the program, the checker generates an execution path fingerprint: FPg for the good return value and FP1 for the error return value.

In a preferred embodiment, the execution path fingerprints are generated as follows. During simulation of the program, at every branch instruction executed by the program a bit is recorded to indicate which branch path was selected by the program. Similarly, each time a jump instruction is executed, where the destination of the jump is variable, one or more bits is recorded to keep track of the jump destination. In addition, whenever a predicated instruction, such as a conditional move instruction, is executed a bit is recorded to keep track of whether the predicate controlling the instruction was true or false. No execution path information is recorded for instructions that do not change the execution path of the program. The sequence of path information bits is fingerprinted, by application of an appropriate one way hash functions, such as a CRC function, so as to produce a fixed length (e.g., 64 bit) path fingerprint. The use of the path fingerprint ensures that the program checker does not need to store an unbounded number of path information bits, which is especially relevant if a large number of instructions are interpreted.

Fingerprints FP1 and FPg are compared in step 312. If the fingerprints are not identical, the call location is marked as checked and execution of the program execution in its original address space is enabled to resume (314). If the fingerprints are identical, steps 308 and 310 are repeated for another N instructions or until any stop condition in a predefined set of stop conditions is reached (316). One example of a stop condition is when FP1 does not equal to FPg. Another example of a stop condition is when FP1 equals to FPg and execution of a predetermined maximum number of instructions has been simulated for both the good and error return values. An appropriate predetermined maximum number of instructions may vary from one implementation to another, but will typically be between a few hundred and a few hundred thousands of instructions. This latter stop condition indicates that the calling procedure does not check for the error condition associated with the error return value used in step 310.

Other examples of stop conditions include:
  reaching certain types of input/output instructions in the program being tested, which cannot be accurately simulated without affecting the state of the program's address space;
  reaching a synchronization instruction that would synchronize the program with another thread of control in the same address space; and
  simulating execution of an illegal memory access instruction that attempts to access a nonexistent memory location.

It is noted that during simulation of the program, call instructions that call the program checker are ignored. In other words, during simulation of the program, the program may execute additional procedure return instructions as though the program had not been instrumented for use with the program checker.

Interpretation is stopped when any of the stop conditions is reached. Whenever a stop condition is reached that indicates that the program under test fails to check for a particular error condition, an error report is generated, the call location is marked as checked (i.e., added to the list of checked call locations), and execution of the program is enabled to resume in the program's main address space (318).

The process shown in FIG. 3B repeats itself until execution of the program in the main address space terminates. However, if all call locations for calls to the procedures listed in the error condition table have been checked, the program testing procedure will exit immediately, at step 304, upon being called.

Figure 3C:
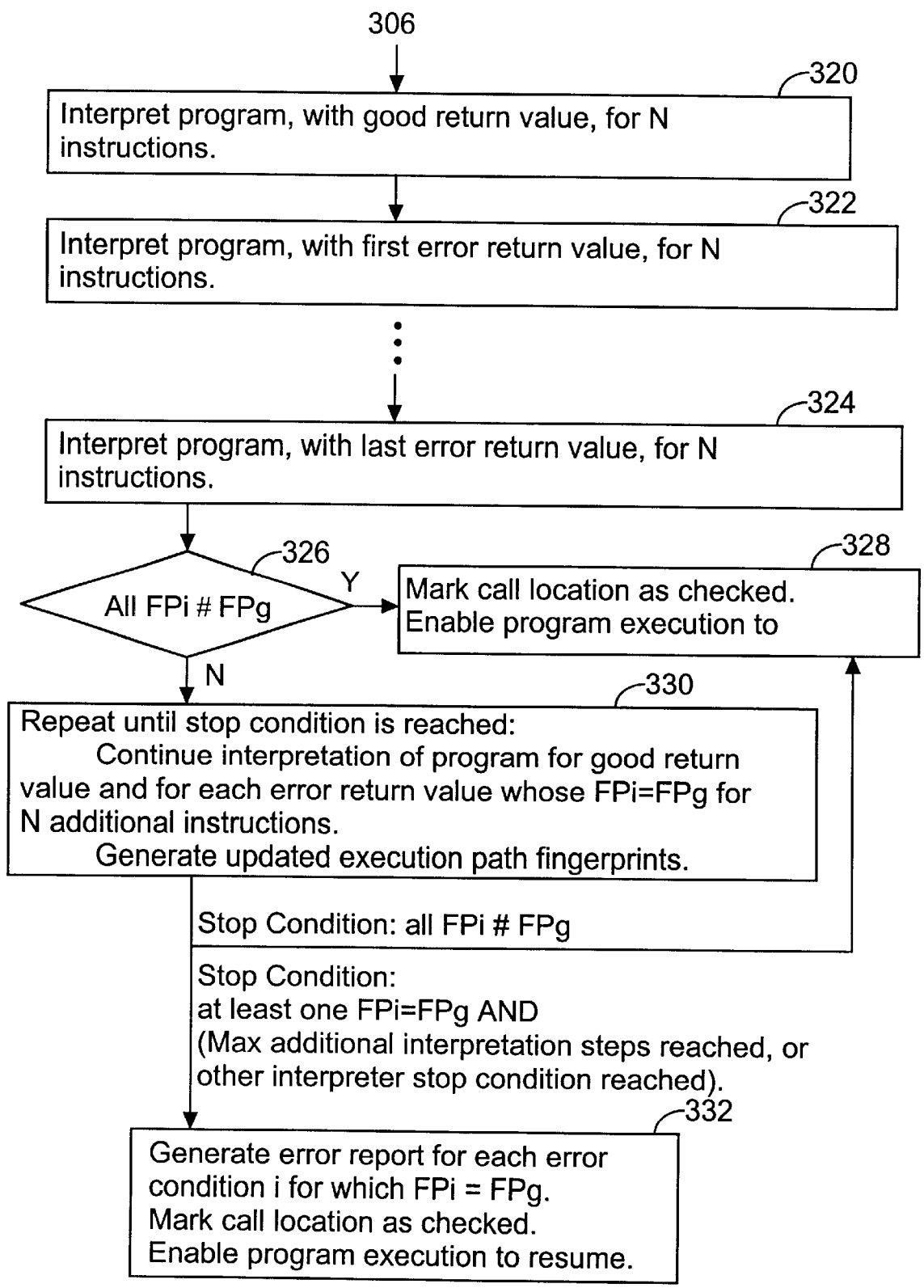
FIG. 3C is a flow chart of an embodiment of the present invention.

FIG. 3C differs from FIG. 3B in that it takes into account the fact that some procedures listed in the error condition table may have more than one error condition. As explained above, the program checker is called just before the execution of each return instruction in each of the procedures listed in the error condition table. The steps shown in FIG. 3C start after execution of steps 304 and 306, shown in FIG. 3B.

When a return instruction in a procedure in the error condition list is reached, the call location has not been previously checked (304), the procedure is about to return a good return value (306), and the error condition list specifies L error conditions for the procedure, the program checker generates L+1 copies of the program. One copy is used to simulate operation of the program using the good return value (320), and each other copy is used to simulate operation of the program with a distinct one of the error return values as indicated in the error condition list entry for the returning procedure (322, 324). Initially, each copy of the program is simulated for the predetermined number N of instructions, and a fingerprint of the program execution path for each copy is generated. Then the fingerprint FPi for each copy of the program using an error return value is compared with the fingerprint FPg for the copy of the program using the good return value (326).

If every one of the FPi is not equal to FPg, this means that the calling procedure checks for all the listed error conditions. Therefore the call location is marked as checked and the execution of the program is allowed to resume (328). If one or more the FPi is equal to FPg, then the program checker continues to interpret for N additional instructions the copy of the program using the good return value and all the copies of the program for each error return value for which FPi equals FPg. As explained above, simulation of the program stops if the interpreter encounters of a predefined set of stop conditions (330). The stop conditions were described above with reference to step 316 of FIG. 3B.

Each time the execution of N additional instructions is completed without reaching a stop condition, the fingerprints FPg and FPi for the program copies still being simulated are compared. For each fingerprint FPi that is not equal to FPg, simulation of the corresponding program copy is stopped, since it has been determined that the calling program checks for the corresponding error condition. If at least one fingerprint FPi remains equal to FPg, the process is repeated.

When the interpreter encounters a stop condition, it stops interpretation and generates a error report for each error condition, i, for which FPi equals FPg. The call location is then marked as having been checked, and program execution is enabled to resume in the program's main address space (332). Each error report indicates that a corresponding error condition may not have been checked by the calling procedure.

Each instance of the program interpreter is initialized when processing of a call location begins so as to replicate operation of the program at the point of execution that the program checker is called. After the program checker has completed testing of the program for a particular call location, the interpreter state for each of the copies of the program (i.e., for each instance of the program interpreter) is discarded.

While using L+1 instances of a program interpreter to run L+1 simulations of execution of the program clearly slows the execution of the program being tested, the testing process is nevertheless relatively fast because the test program automatically checks for all error conditions for each called procedure in the error condition list without requiring any action on the part of the user. Also, the test process runs relatively quickly because each call location in the program is tested only once to determine if all relevant error conditions are detected and processed by the calling program.

ALTERNATE EMBODIMENTS

In an alternate embodiment, other types of tables other than a hash table could be used to store memory values updated by each copy of the program under test.

In some implementations, the normal mode of program execution is interpretation (e.g., for programs written for execution on a virtual machine), in which case it is not necessary to invoke a program interpreter when a particular procedure is encountered—because the interpreter is already running.

In an alternate embodiment, for each call location the good return value path of execution is executed in the normal address space of the program. In this embodiment all the error paths are executed to their maximum depth before investigating the good return value execution path, so that changes to data stored in memory by the good execution path do not affect the error paths. Alternately, the good return value path could be executed first, but old values of memory locations updated by this execution path are stored in a table, and then a copy of the table is used as the initial memory table for each of the error paths.

In yet another alternate embodiment, each of the good and error execution paths are executed in regular memory, but the interpreter logs memory modifications so that they can be undone after each of the error paths are executed. This allows the address space to be returned to its previous state before another path is investigated. If the good path is executed last, its memory modifications do not need to be undone. In addition, in this embodiment any other thread of control that might be running concurrently in the address space must be suspended. If a single-threaded program is being tested, no action is required to accomplish this. In other cases, the operating system will need to be invoked to suspend and then resume execution of the other threads.

Another complication involved with this embodiment is executing an additional M instructions for a path that has already been investigated for K instructions. One way to accomplish this is to start from the original state, just prior to executing the return instruction, and then execute K+M instructions. Alternately, the tester could log new as well as old memory values to enable the path to resume execution at the point where K instructions have already been executed.

In another alternate embodiment the entire address space can be copied, instead of recording memory and register modifications in a log or table. In UNIX™ (a trademark of SCO), this can be accomplished by using the fork( ) call. Depending on the amount of copying caused by the fork( ) operation, this implementation may be much slower than the interpreter implementation of the preferred embodiment discussed in detail above. An advantage of this embodiment is that each path is executed in its own address space and there is no need to implement additional tables for keeping track of new values written to memory.

Instead of simulating execution of the program, in an alternate embodiment the program checker could symbolically analyze the program to determine whether it distinguishes each possible error return value from other return values. However, such symbolic analysis is, in practice, difficult to carry out.

In some embodiments, the error condition list might indicate the proper way to handle certain types of error conditions, and the interpreter might then determine whether the appropriate error handling action is taken. For instance, for some types of errors, detection of the error condition is insufficient and a specific type of remediation may be required. For example, when an error return code indicates that the system was unable to allocate memory, the only acceptable responses may be either aborting execution or freeing up memory resources and then calling the memory allocation procedure again.

In some embodiments the program checker may be configured to allow certain types of error codes to be ignored. For instance, it may be legal for a calling program to ignore certain error codes returned by the printf( ) and fprintf( ) UNLX™ library procedures, because these programs not only return a status code that may indicate an error, they also store any error indication in another location in memory. The calling program can ignore the return codes generated by these procedures, and can check the called procedure's error status memory location instead. The type of procedures that work this way are typically input/output procedures that have an associated input/output stream. For each such procedure, there is typically a corresponding procedure call for checking the corresponding error status memory location. In this embodiment, the error condition table is modified to provide an indication of which procedures have a corresponding procedure for checking a corresponding error status memory location.

Furthermore, it is common programming practice to call such procedures multiple times before checking the corresponding error status memory location. For such procedures, the program checker generates warning messages when the error return values are not checked, but the error messages are put in a separate error buffer for each such procedure. If the corresponding error status memory location is checked later in the program, the error messages in the buffer are discarded, which may be accomplished by modifying the procedures (e.g., ferror( )) used to inspect these status locations to include instructions for discarding error messages in the corresponding buffer. When the program terminates, or the input/output stream associated with the instruction for which warning messages have been buffered is closed, the messages in the error buffer are sent to the user. A disadvantage of this approach is that some programs never terminate (such as servers) or do not close of their input/output streams (such as log files). Warning messages generated by the program checker for these programs will never be reported to the user. However, this problem can be mitigated by sending the user any warning message that has sat in an error buffer for more than a certain amount of time (e.g., a few minutes), at the possible expense of occasional false alarms.

Another instance where it is acceptable for a program to not check for error codes is when the called procedure is known to never return an error value so long as valid input parameters are passed to it. The procedures with this property are indicated by a special label or flag in their entries in the error condition table. If the program checker is able to validate that the input parameters at a particular call location will always be valid, by analysis of the instructions immediately before the procedure call to determine how the input parameters are generated, then the program checker can either (A) return control to the program under test without simulating execution of the procedure for good and error values, or (B) perform the error condition checking analysis, but suppress the generation of a warning message when it is determined that the called procedure cannot generate an error condition value because the input parameters will always be valid. This avoids the generation of erroneous "failure to check error condition" warning messages. Suppressing erroneous warning messages is important because if the program checker generates too many such messages, programmers will not want to use the program checker.

In some embodiments the program checker can determine that while an error condition is detected by the program under test, the error condition may be passed to a procedure higher in the procedure calling tree and then ignored. The program checker may be configured to print a warning message when such error condition handling is detected or is considered possible by the program checker.

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of dynamically detecting unchecked error conditions in a computer program, comprising steps of:

executing the computer program in a defined address space, in conjunction with executing a procedure called by the computer program, invoking a program checker; and in the program checker, determining a first execution path of the computer program when the called procedure exits without returning an error condition value, and recording first information associated with the first execution path of the computer program;

determining a second execution path of the computer program when the called procedure returns a predefined first error condition value when it exits, and recording second information associated with the execution path of the computer program; and comparing the first and second recorded information, and when the first and second recorded information matches reporting that the computer program fails to check for the predefined first error condition value upon return of the called procedure.

2. The method of claim 1, in the program checker, determining the second execution path of the computer program by simulating execution of the computer program when the called procedure returns a predefined first error condition value when it exits, wherein the execution simulation leaves the defined address space unchanged.

3. The method of claim 1, in the program checker, determining the second execution path of the computer program by simulating execution of the computer program when the called procedure returns a predefined first error condition value when it exits, wherein register and memory values in the defined address space are the same at a conclusion of the execution simulation as their values prior to the execution simulation.

4. A method of dynamically detecting unchecked error conditions in a computer program, comprising steps of:

executing the computer program in a defined address space, in conjunction with executing a procedure called by the computer program, invoking a program interpreter; and in the program interpreter, interpreting execution of the computer program, without changing the state of the address space, a first time by interpreting execution of the computer program such that the called procedure exits without returning an error condition value, and recording first information associated with the execution path of the computer program;

interpreting execution of the computer program, without changing the state of the address space, a second time by interpreting execution of the computer program such that the called procedure returns a predefined first error condition value when it exits, and recording second information associated with the execution path of the computer program; and comparing the first and second recorded information, and when the first and second recorded information matches reporting that the computer program fails to check for the predefined first error condition value upon return of the called procedure.

5. The method of claim 4, in the program interpreter, after the comparing step, enabling execution of the computer program in the defined address space to resume.

6. The method of claim 4, in the program interpreter, further interpreting execution of the computer program, without changing the state of the address space, one or more additional times by interpreting execution of the computer program such that the called procedure returns one or more respective predefined additional error condition values when it exits, and recording additional information indicating the execution path of the computer program for each additional interpreting execution of the computer program;

comparing the first and each additional recorded information, and when the first and additional recorded information matches reporting that the computer program fails to check for the corresponding respective predefined additional error condition value upon return of the called procedure.

7. The method of claim 4, in the program interpreter, stopping interpreting execution of the computer program upon the first of (A) interpreting execution of a predefined number of instructions, or (B) any of a predefined set of stop conditions.

8. The method of claim 7, wherein the predefined set of stop conditions includes synchronizing with another thread of control in the same address space.

9. The method of claim 7, wherein the predefined set of stop conditions includes performing an illegal memory access operation.

10. The method of claim 4, in the program interpreter, storing data written by the computer program during interpreting execution in a table outside the defined address space.

11. The method of claim 4, when the first and second recorded information match, analyzing instructions in the computer program that generate input parameters for the called procedure to determine whether the called procedure will never generate the predefined first error condition value when it exits, and when that determination is positive, suppressing the reporting step.

12. The method of claim 4, in the program interpreter, analyzing instructions in the computer program that generate input parameters for the called procedure to determine whether the called procedure will never generate the predefined first error condition value when it exits, and when that determination is positive, skipping the interpreting and comparing steps.

13. A computer program product for use in conjunction with a computer system, the computer program product comprising a computer readable storage medium and a computer program mechanism embedded therein, the computer program mechanism comprising:

a program checker for dynamically detecting unchecked error conditions in a specified computer program;

a mechanism for invoking execution of the program checker during execution of the specified computer program, in conjunction with executing a procedure called by the specified computer program;

wherein the program checker includes instructions for:

determining a first execution path of the specified computer program when the called procedure exits without returning an error condition value, and recording first information associated with the first execution path of the specified computer program;

determining a second execution path of the specified computer program when the called procedure returns a predefined first error condition value when it exits, and recording second information associated with the execution path of the specified computer program; and comparing the first and second recorded information, and when the first and second recorded information matches reporting that the specified computer program fails to check for the predefined first error condition value upon return of the called procedure.

14. The computer program product of claim 13, the program checker including instructions for determining the second execution path of the computer program by simulating execution of the computer program when the called procedure returns a predefined first error condition value when it exits, wherein the execution simulation leaves the defined address space unchanged.

15. The computer program product of claim 13, the program checker including instructions for determining the second execution path of the computer program by simulating execution of the computer program when the called procedure returns a predefined first error condition value when it exits, wherein register and memory values in the defined address space are the same at a conclusion of the execution simulation as their values prior to the execution simulation.

16. A computer program product for use in conjunction with a computer system, the computer program product comprising a computer readable storage medium and a computer program mechanism embedded therein, the computer program mechanism comprising:

a program interpreter; and a program instrumentor for modifying a specified computer program such that the program interpreter is invoked in conjunction with execution of a procedure called by the specified computer program;

wherein the program interpreter includes instructions for:

interpreting execution of the specified computer program, without changing a state of an address space in which the specified computer program is executed, a first time by interpreting execution of the specified computer program such that the called procedure exits without returning an error condition value, and recording first information associated with the execution path of the specified computer program;

interpreting execution of the specified computer program, without changing the state of the address space, a second time by interpreting execution of the specified computer program such that the called procedure returns a predefined first error condition value when it exits, and recording second information associated with the execution path of the specified computer program; and comparing the first and second recorded information, and when the first and second recorded information matches, reporting that the specified computer program fails to check for the predefined first error condition value upon return of the called procedure.

17. The computer program product of claim 16, the program interpreter including instructions for, after comparing the first and second recorded information, enabling execution of the specified computer program in the defined address space to resume.

18. The computer program product of claim 16, the program interpreter including instructions for:

further interpreting execution of the specified computer program, without changing the state of the address space, one or more additional times by interpreting execution of the specified computer program such that the called procedure returns one or more respective predefined additional error condition values when it exits, and recording additional information indicating the execution path of the specified computer program for each additional interpreting execution of the specified computer program;

comparing the first and each additional recorded information, and when the first and additional recorded information matches reporting that the specified computer program fails to check for the corresponding respective predefined additional error condition value upon return of the called procedure.

19. The computer program product of claim 16, the program interpreter including instructions for: stopping interpreting execution of the specified computer program upon the first of (A) interpreting execution of a predefined number of instructions, or (B) any of a predefined set of stop conditions.

20. The computer program product of claim 16, the program interpreter including instructions for: storing data written by the specified computer program during interpreting execution in an array, accessed via a table, wherein the array is outside the defined address space.

21. The computer program product of claim 16, the program interpreter including instructions for: when the first and second recorded information match, analyzing instructions in the specified computer program that generate input parameters for the called procedure to determine whether the called procedure will never generate the predefined first error condition value when it exits, and when that determination is positive, suppressing the reporting of the failure to check for the predefined first error condition value upon return of the called procedure.

22. The computer program product of claim 16, the program interpreter including instructions for: analyzing instructions in the specified computer program that generate input parameters for the called procedure to determine whether the called procedure will never generate the predefined first error condition value when it exits, and when that determination is positive, suppressing execution of the interpreting and comparing instructions.

* * * * *